United States Patent [19]

Ramsbottom et al.

[11] Patent Number: 5,189,532
[45] Date of Patent: Feb. 23, 1993

[54] EDGE-ILLUMINATED NARROW BANDWIDTH HOLOGRAPHIC FILTER

[75] Inventors: Andrew P. Ramsbottom, Bolton; Alan W. Christie, Southport, both of United Kingdom

[73] Assignee: Pilkington P.E. Limited, United Kingdom

[21] Appl. No.: 776,730

[22] Filed: Oct. 15, 1991

Related U.S. Application Data

[63] Continuation of Ser. No. 423,961, Oct. 19, 1989, abandoned.

[30] Foreign Application Priority Data

Oct. 21, 1988 [GB] United Kingdom ............... 88/24784

[51] Int. Cl.$^5$ .......................... G02B 5/32; G03H 1/02
[52] U.S. Cl. .......................................... 359/15; 359/1; 359/9; 359/27
[58] Field of Search .................. 350/3.6, 3.61, 3.7, 350/3.85, 3.68, 3.66, 311; 356/347; 359/9, 15, 10, 11, 28, 32, 1, 3, 885, 27

[56] References Cited

U.S. PATENT DOCUMENTS

| | | | |
|---|---|---|---|
| 3,622,220 | 11/1971 | Kogelnik | 359/3 |
| 3,814,498 | 6/1974 | Tomlinson et al. | 385/37 |
| 4,643,515 | 2/1987 | Upatnieks | 350/3.67 |
| 4,737,001 | 4/1988 | Moss | 350/3.6 |
| 4,790,613 | 12/1988 | Moss | 350/3.7 |
| 4,838,630 | 6/1989 | Jannson et al. | 359/3 |
| 4,946,245 | 8/1990 | Chamberlin et al. | 385/37 |

FOREIGN PATENT DOCUMENTS

| | | |
|---|---|---|
| 0176812 | 4/1986 | European Pat. Off. |
| 0310438 | 4/1989 | European Pat. Off. |
| 0322218 | 6/1989 | European Pat. Off. |

OTHER PUBLICATIONS

Kogelnik, Herwig, "Coupled Wave Theory for Thick Hologram Gratings", Bell System Technical Journal, vol. 48, No. 9, Nov., 1969, pp. 2909-2947.

Patent Abstracts of Japan, vol. 10, No. 24 (E-377) (2081), 30 Jan., 1986 & JP-A-60 182 790 (Sharp) 18 Sep. 1985.

H. Kogelnik et al., "Stimulated emission in a periodic structure".

Applied Optics, vol. 15, No. 11, Nov., 1976, pp. 2628-2629; R. A. Bartolini et al., "Organic medium for integrated optics".

ECOC'86 Technical Digest, vol. 1, 12th European Conference on Optical Communication, Barcelona, Spain, 22nd-25th Sep. 1986, pp. 133-135; D. J. McCartney: "A review of the performance of two types of position tuned filters for use in the 1200-1600 mm range".

Primary Examiner—Bruce Y. Arnold
Assistant Examiner—David R. Parsons
Attorney, Agent, or Firm—F. Eugene Davis, IV

[57] ABSTRACT

This invention concerns a method and apparatus of using the relatively thin holographic material of a transmission holographic optical element in such a manner whereby a narrow spectral bandwidth may be achieved. The interference fringe planes oriented through the depth of the material are interrogated by way of the edge of the holographic optical element whereby the holographic optical element is caused to respond, in use, in the manner of a relatively thick reflection holographic optical element of considerable effective thickness. The apparatus takes the form of a narrow bandwidth optical filter which is interrogated by a tightly focussed interrogating beam.

38 Claims, 5 Drawing Sheets

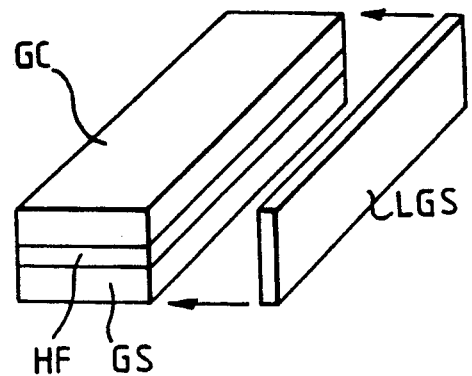
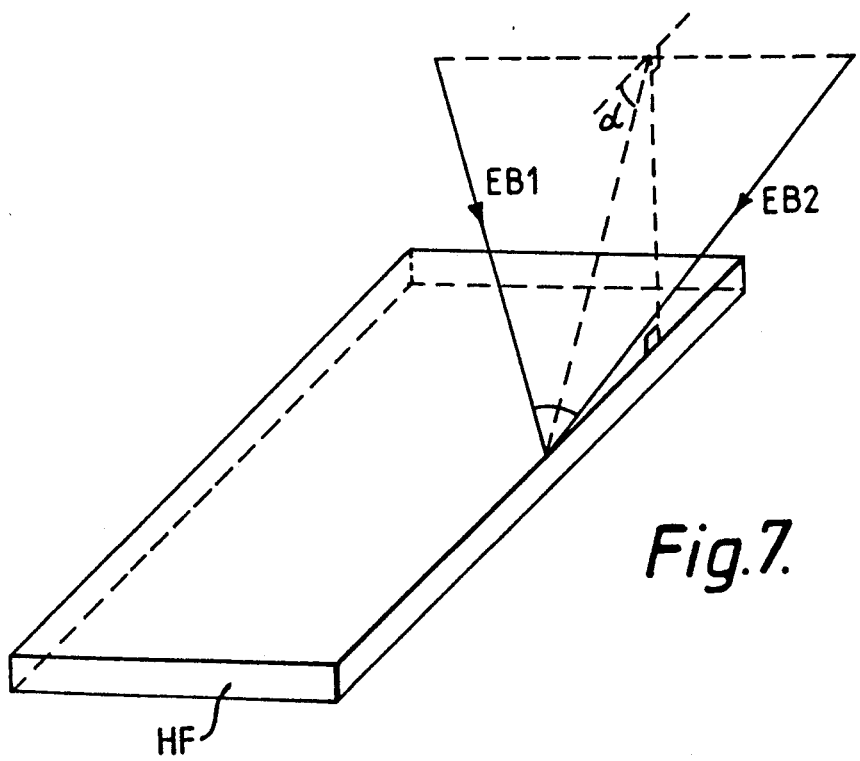

EDGE-ILLUMINATED NARROW BANDWIDTH HOLOGRAPHIC FILTER

This application is a continuation of application Ser. No. 07/423,961, filed Oct. 19, 1989, now abandoned.

BACKGROUND OF THE INVENTION

The present invention relates to holographic elements and to a method and apparatus for the use of such holographic optical elements.

Narrow bandwidth optical filters employing reflective type holographic optical elements are known, and it is also known that the minimum obtainable bandwidth of a holographic optical element decreases as the holographic material, or film, thickness increases. Thus, it is clear that to attain very narrow bandwidth optical filters, say of the order of one nanometer spectral bandwidth, relatively thick films are required.

However, construction of suitable thick reflective type holographic optical elements with sufficient effective thickness for this purpose has hitherto been difficult to achieve. The effective thickness is primarily limited by a) the ability of any necessary processing solutions to diffuse into the depth of the film, b) attenuation of the exposure beam through the depth of the film, and c) the dependence of the average film refractive index on exposure causing a progressive dephasing of the recorded interference fringes through the depth of the film.

As a consequence of these problems, some of the useable thickness of the film is effectively wasted, and the recorded hologram is highly variable or "chirped". Thus, it is not possible to achieve very narrow operating bandwidths which would otherwise be attainable with such thick films.

Generally, it can be said that very thick films are more difficult to produce as compared with thinner films, and the production of thick films is also prone to giving a low yield during the coating and preparation stage because of film adhesion and quality problems.

An aim of this invention is to provide a method and apparatus for the use of holographic optical elements which overcomes the aforementioned problems in an efficient manner.

SUMMARY OF THE INVENTION

According to the present invention there is provided a method of using a relatively thin holographic material of a transmission holographic optical element to realise the properties and characteristics of a reflection hologram of considerably greater effective thickness, wherein interference fringe planes are oriented through the depth of the holographic material are interrogated by way of an edge of the holographic optical element and wherein the transmission holographic optical element responds, in use, in the manner of a relatively thick reflection holographic optical element of considerable effective thickness thereby enabling a very narrow spectral bandwidth to be achieved.

Preferably the holographic material is a photosensitive volume phase holographic material, which may comprise dichromated gelatin or photopolymer.

The transmission hologram may be constructed by use of two separate construction beams being incident from one side of the holographic material.

The transmission hologram may also be constructed by use of a first construction beam and a second beam being a virtual image provided by a mirror both beams being effectively incident from one side of the holographic material.

In constructing a fixed wavelength holographic optical element which is non-tuneable, the separation angle between the beams remains constant to produce uniformly spaced interference fringe planes to effect a specific holographic optical element and optical filter operating wavelength.

In constructing a variable holographic optical element which is wavelength tuneable according to position, a beam separation angle separating the two beams emanating from two separate beam sources is progressively varied at points along a line equidistant between the two beam sources across the holographic material, whereby progressively variable-spaced interference fringe planes are produced within the holographic material to effect a range of holographic optical element and optical filter operating wavelengths.

The holographic optical element is preferably a laminate of exposed and as necessary, processed holographic material sandwiched between a substrate and a coverplate both of which may be glass or plastics. In certain circumstances the coverplate may be metal.

The exposed edge of the holographic material may be environmentally protected by a thin strip, which may be glass or a plastic material, laminated over the film edge.

A narrow and tightly focussed interrogating beam, having a focussed spot size which has a dimension less than the thickness of the holographic material, may be employed for interrogating the interference fringes.

The invention is also concerned with apparatus in the form of a narrow bandwidth optical filter comprising, a transmission holographic optical element including a thin film of holographic material in which a transmission hologram is constructed, wherein interference fringe planes are oriented through the depth of the holographic material, and interrogation means for interrogating the interference fringes by way of an edge of the holographic material, wherein the transmission holographic optical element is caused, in use, to respond in the manner of a relatively thick reflection holographic optical element to realise holographic properties and characteristics of a reflection hologram of considerable effective thickness to enable a very narrow spectral bandwidth to be achieved.

Interrogating the interference fringes of a fixed-wavelength non-tuneable optical filter with the tightly focussed interrogating beam provided by the interrogating means enables the optical filter to operate at a single wavelength of peak diffraction efficiency.

Interrogating the interference fringes of a variable wavelength tuneable optical filter with the tightly focussed interrogating beam enables the optical filter to operate at a plurality of wavelengths of peak diffraction efficiency. Interrogation of the interference fringes of the tuneable optical filter may be achieved by addressing particular positions along the interrogating edge of the holographic optical element by either scanning the interrogating beam along the interrogating edge while maintaining the holographic optical element stationary, or alternatively moving the holographic optical element with respect to the beam while maintaining the interrogating beam stationary.

The invention will be more readily understood from the following description of several exemplary embodiments which should be read in conjunction with the accompanying drawings in which:

BRIEF DESCRIPTION OF THE DRAWINGS

FIG. 6 illustrates schematically (not to scale), the construction of a holographic optical element including a phase holographic material suitable for use in this invention and showing how the edge of the material may be protected;

FIG. 7 illustrates a schematic diagram of an alternative exposure geometry for construction of the holographic optical element as illustrated in FIG. 4;

DESCRIPTION OF PREFERRED EMBODIMENT

Figure 1:
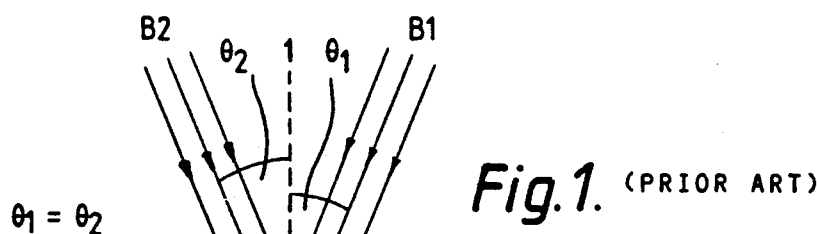
FIG. 1 illustrates a schematic diagram of an exposure system for constructing a transmission holographic optical element with two construction beams.
Figure 2:
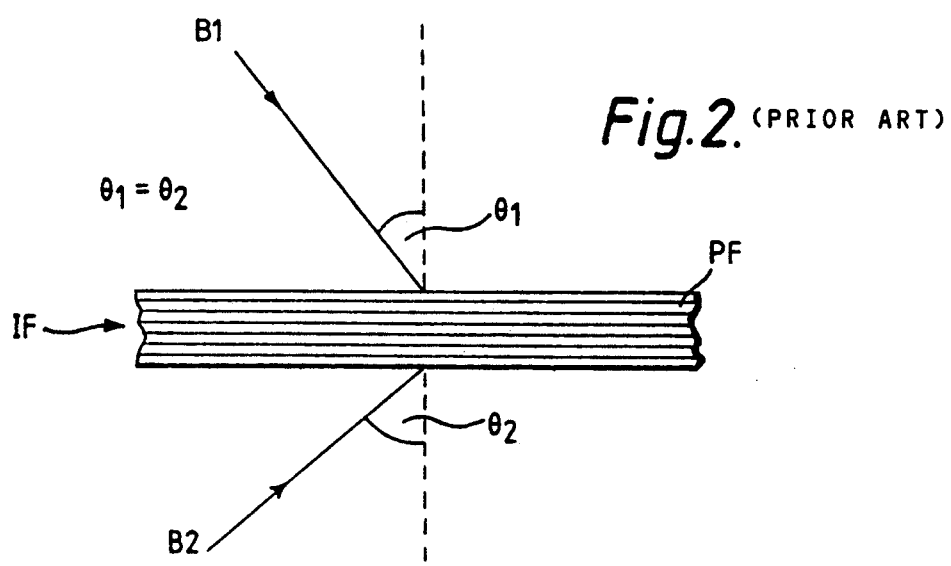
FIG. 2 illustrates a schematic diagram of an exposure system for constructing a reflection holographic optical element with two construction beams.

Referring to the drawings, it is first necessary to appreciate the method of construction of holographic elements. Briefly there are two basic types, the transmission holographic element as illustrated in FIG. 1, and the reflection holographic element as illustrated in FIG. 2.

The holograms are formed in a photosensitive volume phase holographic material HF comprising for instance, dichromated gelatin or photopolymer. It is well known that when two coherent beams of light coincide, they interfere to form "interference fringes" which appear as light and dark bands. When the two beams interfere in the photosensitive film or holographic material the fringes are recorded as a change in the holographic material. The resulting fringe pattern so recorded in the holographic material forms the holographic optical element following any necessary film processing. The transmission holographic element is constructed when the two beams B1 and B2 (FIG. 1) are incident from one side of the photosensitive film only. The reflection holographic element is constructed when the two beams B1 and B2 (FIG. 2) are incident from opposite sides of the photosensitive film.

If it is assumed that the beams comprise plane waves, in both the transmission and reflection type holographic elements, the interference fringes IF lie in a direction parallel to the bisector of the angle between the two beams. Thus, in the case of the transmission holographic element the interference fringe planes IF run through the depth of the film whereas in the case of the reflection holographic element the interference fringe planes IF run along the plane of the film.

In both the transmission and reflection holographic optical elements, reconstruction is usually achieved by directing the reconstruction beam towards the face of the holographic element.

Figure 3:
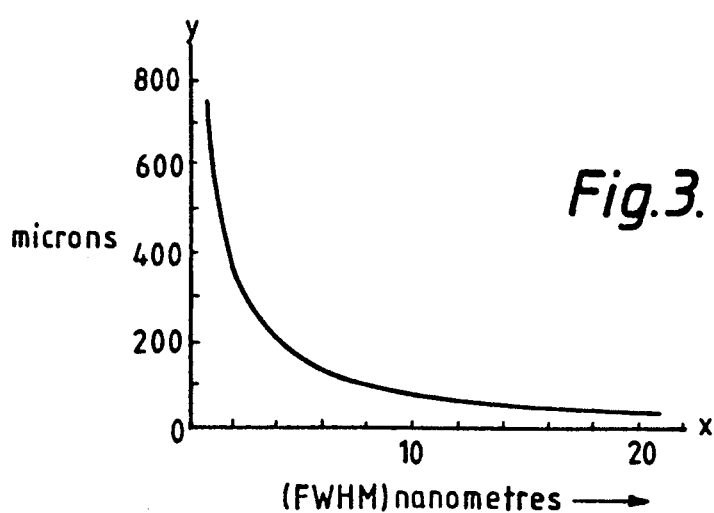
FIG. 3 illustrates a graph derived from the H. Kogelnik, "Coupled Wave Theory for Thick Hologram Gratings" (reference follows), which shows how film thickness is related to minimum achievable bandwidth for a reflection hologram.

Referring now to FIG. 3, there is illustrated a graph of bandwidth (measured Full Wave Half Maximum—FWHM) in nanometres (x axis) against film thickness in microns (y axis), for a reflection holographic optical filter, derived from the H. Kogelnik, "Coupled Wave Theory for Thick Hologram Gratings", The Bell systems Technical Journal, 48(9), 2909-2947 (1969). By examination of this graph, it is clearly evident that to obtain very narrow bandwidth for an optical filter, it is necessary for the film thickness to be relatively thick. For instance, to achieve a very narrow spectral bandwidth of the order of one nanometre, the thickness of the film required will be of the order of 700 micron to 800 micron, as predicted from this theory.

Given the problems previously outlined, in implementing this invention, advantage is taken of the recognition that a standard holographic optical element, constructed as a transmission hologram, when viewed from an edge along which the interference fringe planes lie, the transmission holographic optical element appears as a reflection holographic optical element having considerable effective thickness. Thus, the hologram thickness is not the distance from the front to the back surface of the film, but is instead the dimension lying along the plane of the film. Such an arrangement has the potential advantages of allowing very thick film performance with ease of thinner film handling and processing. In particular, for a given film thickness, for example 100 to 200 microns, this method realises the holographic properties and characteristics of a film of similar nature, but of considerable greater effective thickness, for example, 500 to 1000 microns, while avoiding the problems usually encountered in handling such a thicker film.

Figure 4:
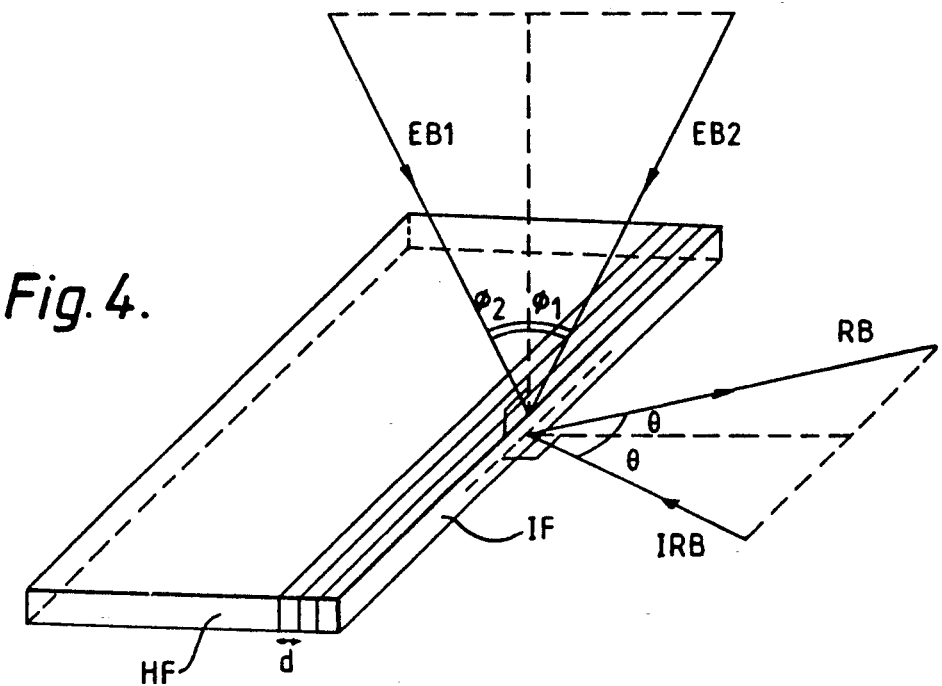
FIG. 4 illustrates a schematic diagram of a holographic optical element (only the photosensitive material being shown for simplicity) with the exposure geometry for constructing a transmission holographic optical element and the orientation of interference fringes within the photosensitive film together with the geometry for interrogating the edge of the element in order that it responds as a relatively thick reflection type holographic optical element.

By referring to FIG. 4 it will be seen how this concept may be implemented. The holographic material HF has recorded within it a transmission hologram by means of the exposure beams EB1 and EB2 in the normal and known manner. This results in an interference pattern being set up in the film with the interference fringe planes IF (see FIG. 4 also) being recorded through the depth of the film in the manner as illustrated and described with reference to FIG. 1.

The interference fringes within the holographic optical element are interrogated from the edge by a narrow and tightly focussed interrogating beam IRB emanating from a suitable interrogating means e.g. a laser and lens system (not shown). The diffraction beam is represented by the designation RB.

A limiting factor on the focussed spot size of the interrogating beam IRB is the film thickness. Clearly the focussed spot size should have a dimension which is less than the edge of the film itself.

Various other factors govern the optimum spot size for this arrangement. For instance, in a tuneable filter the interference fringe spacing continuously varies, and the depth of the film is appreciable compared with the spot size. This factor demands that the spot size be small so as to encompass as little variation in fringe spacing as possible in order to achieve the objective of a narrow bandwidth.

Figure 5:
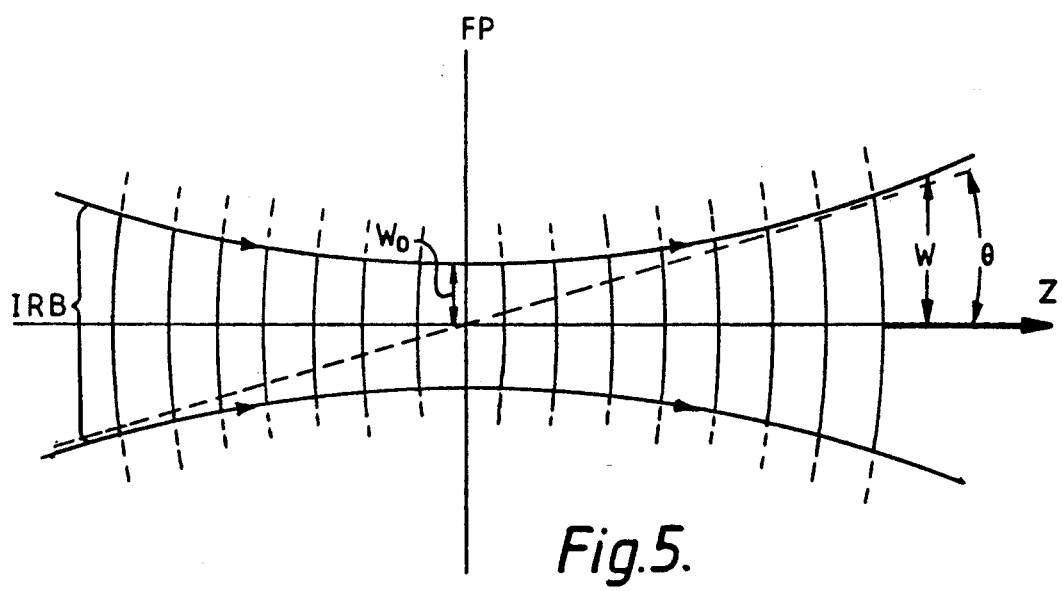
FIG. 5 illustrates the geometry of a focussed Guasian interrogating laser beam suitable for use with this invention.

To obtain a small spot size, a very tightly focussed beam is required (see FIG. 5). However, it is known that a tightly focussed beam IRB diverges rapidly beyond the focal plane FP of the spot. As a consequence of this a small spot size only exists at one point in the depth of the film, either on the edge of the film or at a point within it. In addition, the large range of angles in the diverging beam are seen as variations in incident angle to the fringes which causes broadening of the bandwidth. The optimum spot size will thus be a trade-off, depending upon, film thickness, effective hologram thickness and the degree of tuneability required, and so on.

The geometry of the focussed interrogating beam IRB is shown in FIG. 5. The minimum waist size at the focal plane FP is $2W_o$ and this diverges along the beam axis Z beyond the waist to a size 2W. The equations relating the divergence angle $\theta$ and the beam size 2W to the focus size $2W_o$ are:

$$\theta = \frac{\lambda}{\pi W_0} \; ; \; W^2 = W_0^2 \left( 1 + \left( \frac{\lambda z}{\pi W_0^2} \right)^2 \right)$$

Two types of narrow bandwidth holographic optical filters will be described, one type which is operable on a fixed wavelength basis which is non-tuneable, and another type which is operable on a variable wavelength basis which is tuneable.

Referring now to FIGS. 6 through 11 it will be appreciated that the holographic optical element which is used in the narrow band optical filter is constructed as a transmission holographic element by two separate collimated laser construction or exposure beams, for example EB1 and EB2 (see FIG. 4) and from point sources PS1 and PS2 (see FIG. 8) which are incident on the same side of the photosensitive plate. It will be appreciated that for construction of a fixed wavelength holographic optical element (non-tuneable) for use as an optical filter, the beam separation angle $\phi$ remains constant during construction. However, for construction of variable wavelength holographic optical element (tuneable) for use as an optical filter, the beam separation angle $\phi$ is progressively varied along the line PQ (see FIG. 8).

Referring now to FIG. 6, it should be appreciated that the holographic film HF is a photosensitive volume phase holographic material, typically dichromated gelatin or photopolymer, which is exposed and processed as necessary, supported and environmentally protected as required. Typically, the film may be sandwiched between a substrate GS and a coverplate GC. The substrate GS and the coverplate GC can be glass or plastics material and in certain circumstances the cover plate may be metal. The edge of the film, containing the interference fringes IF, having their planes oriented through the thickness of the film (see FIG. 4) is protected by a thin glass strip LGS, or other suitable material such as plastics, laminated over the film edge (in the direction as indicated by the arrows shown in FIG. 6).

The so-called edge-on reflection holographic optical element consists of a set of interference fringe planes substantially parallel to the addressable edge. The operating wavelength $\lambda t$ (i.e. the wavelength of peak diffraction efficiency) of such a holographic optical element in use as an optical filter is determined by the spacing of the interference fringe planes, d, and this spacing being determined by the angle of the exposure beams. The smaller the angle of exposure beams with respect to the normal to the plate, the greater the interference fringe spacing and hence the operating wavelength.

Referring to FIG. 4, it will be appreciated that for a fixed interrogation angle $\phi$ ($\phi_f$ on refraction within the film), the relationship is determined by the Bragg condition, and can be written as:

$$\lambda t = 2 n d \cos \phi_f$$

where $n \sin \phi_f = \sin \phi$ in accordance with Snell's law.

This is illustrated in FIG. 4 where it will be seen that the interrogating and diffracted beams are represented by the rays IRB and RB respectively. The associated construction beams for this type of hologram are represented by the rays EB1 and EB2. The fringe spacing, d is dependent on the wavelength and angle of construction and generally is given by the equation:

$$nd (\sin \phi_{1f} + \sin \phi_{2f}) = \lambda_c$$

where $\lambda c$ is the construction wavelength, and n is the film refractive index.

$\phi_{1f}$, $\phi_{2f}$ are the incidence angles of the two construction beams within the film. These can be related to the angles $\phi_1$, $\phi_2$ in air using Snell's Law:

$$n \sin \phi_{1f} = \sin \phi_1$$
$$n \sin \phi_{2f} = \sin \phi_2$$

hence $d(\sin \phi_1 + \sin \phi_2) = \lambda c$.

In order to produce interference fringe planes substantially perpendicular to the film, i.e. parallel to the edge, the two construction beams must be at equal angles to the film, i.e. $\phi_1 = \phi_2 = \phi$ and in these circumstances the above equation reduces to :

$$2d \sin \phi = \lambda c.$$

It should be noted that the plane containing the two construction beams EB1 and EB2 need not be perpendicular to the film surface but may be inclined at an elevation angle $\alpha$, less 90°, as shown in FIG. 7 without altering the recorded interference fringe structure.

Figure 8:
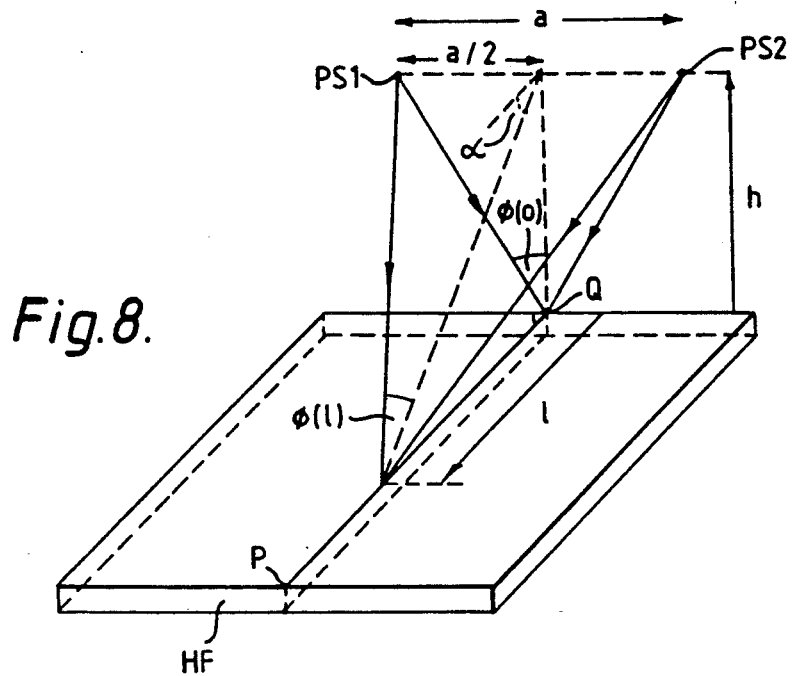
FIG. 8 illustrates a schematic diagram of the construction geometry for a tuneable holographic optical element (only the photosensitive material being shown for simplicity) for use as an optical filter in accordance with this invention; and, FIG. 9 illustrates a schematic diagram of one system of construction of a tunable holographic optical element (only the photosensitive material being shown for simplicity) for use as an optical filter using two beams originating from focussed point sources.

In order to construct a tuneable holographic element for use as an optical filter, the interference fringe spacing d, and therefore the angular separation of the two construction beams must be varied at points along the direction of tuneability, i.e. effectively along the film edge. This is so that the fringes will converge in a direction generally parallel to the film edge. A construction geometry which will achieve this is shown in FIG. 8.

The construction beams originate from two separate point sources PS1 and PS2 at a fixed height, h, above the film surface. Along a line PQ, equidistant from the two point sources PS1 and PS2, the interference fringe planes bisect the angle between the two beams and will, therefore, be perpendicular to the film surface. Thus, both the elevation angle α, and the beam separation angle φ are varied along this line to enable a holographic optical element to be constructed which is suitable for use in a tuneable optical filter.

It will be appreciated that a variation in elevation angle is inconsequential, however a variation in separation angle φ gives rise to the tuneable facility. By interrogating the exposed edge of the holographic optical element, it is possible to realise a position—tuneable holographic optical filter.

As an example, it can be shown that the tuning position, $\lambda_t (l)$ can be related to the position, l by the equation $$\lambda_t(l) = \frac{n \lambda_c}{\sin \phi(l)}$$

$$\text{where } \phi(l) = \tan^{-1} \frac{a}{2(l^2 + h^2)^{\frac{1}{2}}}$$

where:

a is the distance separating the two point sources
h is the height from the film to the point sources,
φ(l) is the angle of separation between the two beams for a position l.
and $\lambda_c$ is the construction wavelength.

Figure 9:
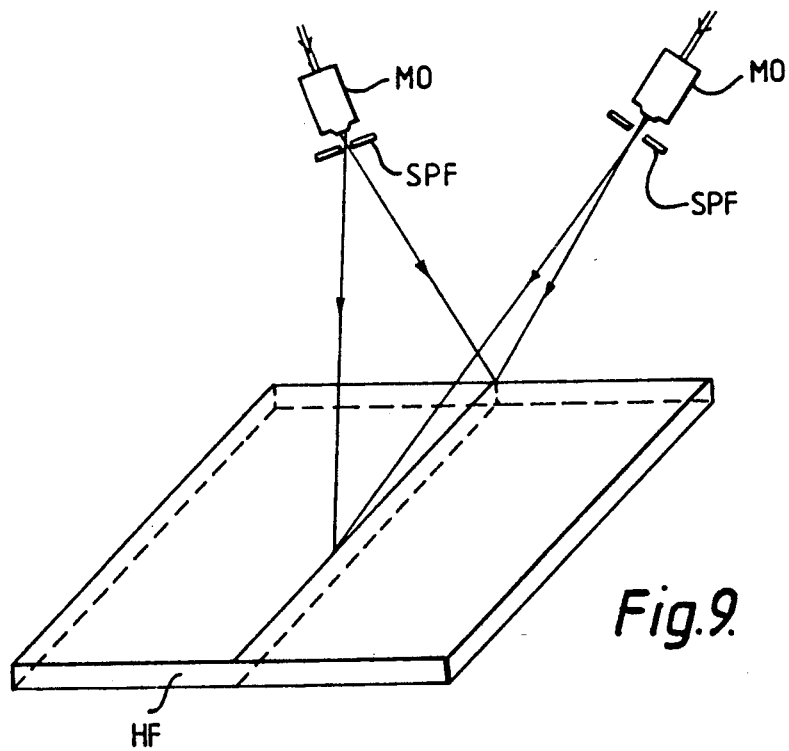
Figure 10:
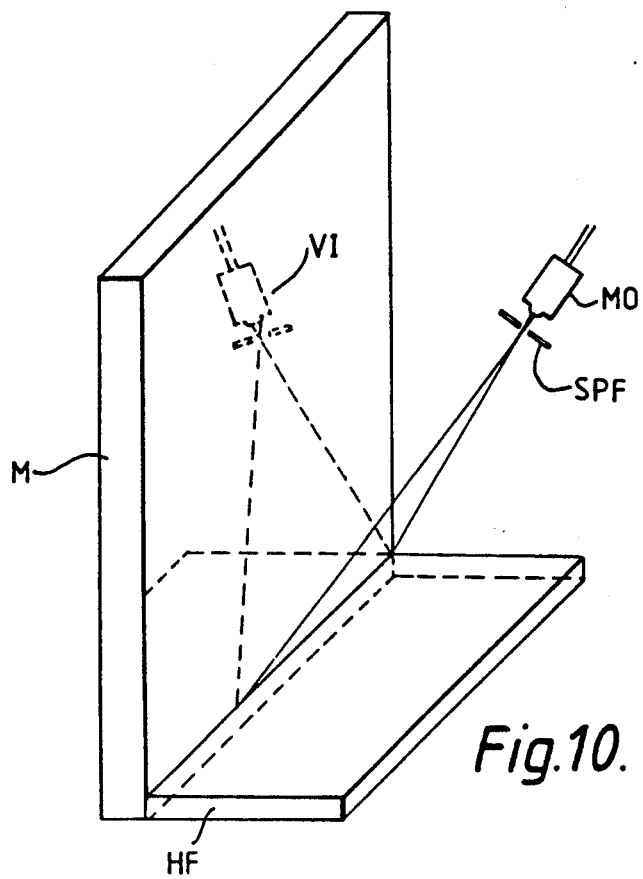
FIG. 10 illustrates a schematic diagram of an alternative system of construction of a transmission type holographic optical element (only the photosensitive material being shown for simplicity) using a single beam originating from a focussed point source.

The two point sources PS1 and PS2 are conveniently provided by a pair of lens systems, for example, microscope objective/spatial filter combinations, comprising a microscope objective MO and spacial filter SPF as shown in FIG. 9. Alternatively only one such assembly could be used, a second beam source or virtual image being provided by mirror M positioned adjacent to one edge of the holographic optical element and at right angles to it, as shown in FIG. 10.

Figure 11:
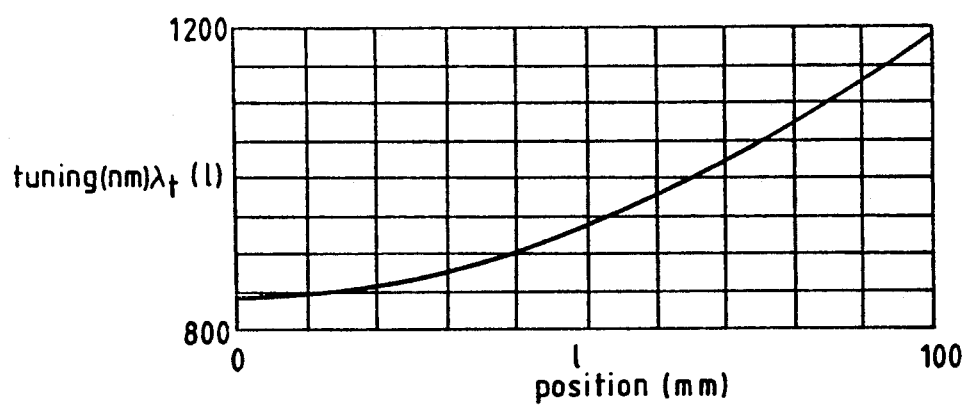
FIG. 11 illustrates a graph showing the theoretical spectral behaviour for a tuneable filter having wavelengths between 850 nm and 1200 nm.

Typical construction parameters are shown in Table 1 below and the calculated filter behaviour is shown by the graph illustrated in FIG. 11. The filter gives a tuning wavelength ranging from 800–1200 nm over the length of the holographic optical element which is 100 mm. These are typical requirements for a single mode optical fibre de-multiplexing system in which the tuneable optical filter is eminently suitable.

TABLE 1

| Source separation | a = 180 mm |
|---|---|
| Source height | n = 45 mm |
| Refractive index | h = 1.54 |
| Construction wavelength | λ c = 488 nm |

It should be appreciated by those skilled in the art that in order to address a particular position along the interrogating edge of the holographic optical element and hence the interference fringes, either the interrogating beam may be scanned along the edge with the holographic optical element stationary, or alternatively the interrogating beam may be maintained stationary and the holographic optical element moved with respect to the beam. In both these arrangements the operating wavelength of the optical filter may be selected as required in accordance with position and angle of the interrogating beam in relation to the edge of the holographic element.

It should also be appreciated by those skilled in the art that the two construction beams EB1 and EB2 need not be simple spherical or collimated beams but can be of a complex nature being designed to produce interference fringes of a complex or arbitrary nature. For example, the interference fringe planes need not be exactly parallel to the film edge and may effectively be substantially of wedge-shaped form in effect at an angle to the film edge, or the interference fringe planes may be of curved form.

These interference fringes possess optical power in order to perform a specific imaging task while also taking advantage of the thick film type holographic properties and characteristics in the manner of this invention.

It should be appreciated that while this invention is illustrated with reference to its application as a narrow bandwidth optical filter, it may be implemented in other applications, for instance, a holographic information storage means.

What is claimed is:

1. A method of using the thin film holographic material of a transmission holographic optical element having two generally parallel large area surfaces and an edge connected between said surfaces to realize the properties and characteristics of a reflection hologram, said element having interference fringe planes extending from one of said large area surfaces of said thin film to the other, and said reflection hologram being of considerably greater effective thickness than the thickness of the holographic material between said large area surfaces of said film comprising:

the step of interrogating the interference fringe planes of the holographic material by illuminating an edge of the holographic optical element with a narrow and tightly focused interrogating beam having a focused spot size which has a dimension less than the thickness of the holographic material to cause diffracted illumination to emerge from said edge;

wherein in use the transmission holographic optical element responds in the manner of a relatively thick reflection holographic optical element.

2. A method as claimed in claim 1, wherein the holographic material is photosensitive volume phase holographic material.

3. A method as claimed in claim 1, wherein the transmission hologram is constructed by the use of two separate construction beams being incident on one of said large area surfaces of the holographic material.

4. A method as claimed in claim 3, wherein for construction of a fixed wavelength holographic optical element, which is non-tuneable, a beam separation angle separating the two construction beams remains constant to produce uniformly spaced interference fringe planes to effect a specific operating wavelength.

5. A method as claimed in claim 3, wherein said two separate construction beams are created by two beam sources and are incident on the holographic material separated by a beam separation angle which is varied at points along a line equidistant between said two beam sources across the holographic material whereby the spacing between said interference fringe planes varies in a direction parallel to said line.

6. A method as claimed in claim 5, wherein the interference fringe plane are interrogated by a narrow and tightly focussed interrogating beam having a focussed spot size which has a dimension less than the thickness of the holographic material.

7. A method as claimed in claim 5, wherein interrogation of the interference fringe planes is achieved by addressing particular positions along the edge of the holographic optical element by scanning the interrogating beam along the edge of the holographic optical element while maintaining the holographic optical element stationary with respect to the interrogating beam.

8. A method as claimed in claim 5, wherein interrogation of the interference fringe planes is achieved by addressing particular positions along the edge of the holographic optical element by moving the holographic optical element with respect to the interrogating beam while maintaining the interrogating beam stationary.

9. A method according to claim 1, wherein the interrogating beam is focused to provide a focused spot in a focal plane lying in the region of said edge.

10. Apparatus in the form of a narrow bandwidth optical filter comprising in combination:
   a transmission holographic optical element comprising a thin film of holographic material having two large area surfaces and an edge in which a transmission hologram is constructed, wherein interference fringe planes are formed through the depth of the holographic material from one of said surfaces to the other;
   and interrogation means for interrogating the interference fringes by illuminating an edge of the holographic material with a narrow and tightly focused interrogating beam having a focused spot size which has a dimension less than the thickness of the holographic material to cause diffracted illumination to emerge from said edge,
   wherein the transmission holographic optical element responds, in use, in the manner of a relatively thick reflection holographic optical element to realize holographic properties and characteristics of a reflection hologram of greater effective thickness than said film.

11. Apparatus as claimed in claim 10, wherein the transmission holographic optical element is constructed such that said interference fringe planes have a spacing that varies in a direction parallel to said edge to effect a range of optical filter operating wavelengths.

12. Apparatus as claimed in claim 10, wherein the holographic optical element is a laminate of holographic material sandwiched between a substrate and a coverplate.

13. Apparatus as claimed in claim 10, wherein said interrogated edge of the holographic material is protected by a strip of material laminated over it.

14. Apparatus as claimed in claim 10, wherein the holographic material is a photosensitive volume phase holographic material.

15. Apparatus as claimed in claim 14, wherein the photosensitive volume phase holographic material is dichromated gelatin.

16. Apparatus as claimed in claim 14, wherein the photosensitive volume phase holographic material is a photopolymer.

17. Apparatus as claimed in claim 10, wherein the interference fringe planes are at an acute angle to the edge of the holographic material.

18. Apparatus according to claim 10, wherein the interrogation means is arranged to produce a focused spot in a focal plane in the region of said edge.

19. A method of manufacturing a holographic optical filter element comprising providing a film of holographic material having generally parallel large area surfaces and thin edges connected between them, and optically generating in the film a plurality of interference fringes in the form of interference fringe planes or surfaces oriented generally perpendicular to and extending between said large area surfaces of the material, thereby to produce a reflection hologram responsive to a focused interrogation beam which has a focused spot size having a dimension less than the thickness of the holographic material and which is incident on a thin edge of the film to produce a spectrally filtered diffracted beam emerging from said edge.

20. A method according to claim 19, wherein the filter element is a bandpass filter.

21. A method according to claim 19, wherein the interrogation beam is focused in a focal plane in the region of the said edge.

22. A holographic optical filter comprising a film of holographic material having generally parallel large area surfaces and thin edges connected between them and having fixed therein a plurality of interference fringes in the form of interference fringe planes or surfaces generally perpendicular to and extending between said large area surfaces of the material, and means for illuminating a thin edge of the film with a focused beam having a focused spot size which has a dimension less than the thickness of the film, the filter being a reflection holographic element to diffract the focused beam thereby to produce a spectrally filtered beam emerging from said edge.

23. An optical filter according to claim 22, wherein said beam is focused in a focal plane lying in the region of said thin edge.

24. An optical system comprising:
   A. a transmission hologram having a generally planar elongated edge and a transmission optical axis generally parallel to the plane of said edge and generally perpendicular to the elongation thereof; and
   B. means for illuminating said edge of said hologram generally perpendicular to said transmission optical axis with a focused beam having a focused spot size which has a dimension less than the thickness of said film to form diffracted illumination emerging from said edge.

25. The optical system defined in claim 24 wherein said transmission hologram comprises interference fringe planes generally parallel to said optical axis.

26. The optical system defined in claim 25 wherein the spacing between said interference fringe planes decreases in a direction generally parallel to said edge.

27. An optical system as defined in claim 24 wherein said hologram is formed in a thin film; the thickness of which along said optical axis is no greater than about 200 microns.

28. The optical system defined in claim 27 wherein the width of said film measured from said edge perpendicular to said optical axis is greater than about 500 microns.

29. The system defined in claim 24, wherein said beam is focused to provide a focused spot in a focal plane lying in the region of said edge.

30. The method of making and using a holographic fringe grating comprising the steps of:
   A. exposing with illumination a film of photosensitive material having two surfaces and an edge to form therein a holographic grating of fringe planes generally parallel to said edge and extending from one of said surfaces to the other, said illumination impinging solely on one of said surfaces of said material, said surface being generally perpendicular to said edge; and B. illuminating said film through said edge with a narrow and tightly focused beam having a focused spot size which has a dimension less than the thickness of said film to cause diffracted illumination to emerge from said edge.

31. The method defined in claim 30, wherein the illuminating beam is focused to provide a focused spot in a focal plane lying in the region of said edge.

32. The method defined in claim 31, wherein the illuminating beam is an unconfined laser beam incident on said edge.

33. A hologram comprising:
A. a film of material having two surfaces and an edge and having a holographic fringe pattern therein, the fringes of which are generally perpendicular to said surfaces of said film;
B. said edge of said film being generally parallel to said fringe pattern and being transparent for illumination of said fringe pattern through said edge; and,
C. interrogation means for interrogating said fringe pattern, the interrogation means providing a focused interrogating beam for illuminating said fringe pattern through said edge with a focused spot size having a dimension less than the thickness of said film to produce diffracted illumination emerging from said edge.

34. The hologram defined in claim 33 wherein the thickness of said film between said surfaces is no greater than about 200 microns.

35. The hologram defined in claim 34 wherein the effective width of said film measured from said edge perpendicular to said fringes is greater than about 500 microns but no greater than about 1,000 microns.

36. The hologram defined in claim 33 wherein the spacing between said fringes decreases in a direction parallel to said edge.

37. The hologram defined in claim 33 wherein said interrogation means provides a spot focused at a focal plane lying in the region of said edge.

38. The hologram defined in claim 37 wherein said interrogating beam is an unconfined laser beam incident on said edge.

* * * * *